United States Patent
Frentz et al.

(10) Patent No.: US 6,671,604 B1
(45) Date of Patent: Dec. 30, 2003

(54) METHOD AND DEVICE FOR VARIABLY SETTING THE BRAKE FORCE IN A HYDRAULIC BRAKE SYSTEM OF A MOTOR VEHICLE

(75) Inventors: Georg Frentz, Nuertingen (DE); Hans-Georg Riedel, Pforzheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/936,614

(22) PCT Filed: Jan. 25, 2000

(86) PCT No.: PCT/EP00/00541

§ 371 (c)(1),
(2), (4) Date: Dec. 31, 2001

(87) PCT Pub. No.: WO00/55024

PCT Pub. Date: Sep. 21, 2000

(30) Foreign Application Priority Data

Mar. 17, 1999 (DE) .......................................... 199 11 902

(51) Int. Cl.[7] .................................................. B60T 8/32
(52) U.S. Cl. ............................... 701/70; 701/71; 701/74; 303/150; 180/197; 188/181 A
(58) Field of Search .............................. 701/70, 71, 73, 701/74, 78, 83; 303/150, 174, 166; 180/197; 188/181 A, 218 XL, 382

(56) References Cited

U.S. PATENT DOCUMENTS 5,513,907 A * 5/1996 Kiencke et al. ............. 303/150
6,378,669 B1 * 4/2002 Kurasako et al. ..... 188/218 XL

FOREIGN PATENT DOCUMENTS

| DE | 4427170 | 11/1996 |
| GB | 2297134 | 7/1996 |
| JP | 5092760 | 4/1993 |

* cited by examiner

Primary Examiner—Thomas G. Black
Assistant Examiner—Arthur D. Donnelly
(74) Attorney, Agent, or Firm—Crowell & Moring LLP

(57) ABSTRACT

A method for variably setting the braking force in a hydraulic brake system of a motor vehicle with a brake pressure is produced which is applied to a wheel-braking device. In order to compensate a diminishing braking effect in hydraulic brake systems in wide ranges, the real actual friction factor between the brake disc and brake pad of at least one wheel brake is determined and compared with a prescribable desired friction factor, in the event of an impermissible undershooting of the actual friction factor by comparison with the desired friction factor, the brake pressure or a variable correlated with the brake pressure being increased to a value multiplied by a correction factor if the actual friction factor is within a defined friction factor stabilization range which comprises a plurality of friction factors below the desired friction factor.

19 Claims, 1 Drawing Sheet

Figure 1:
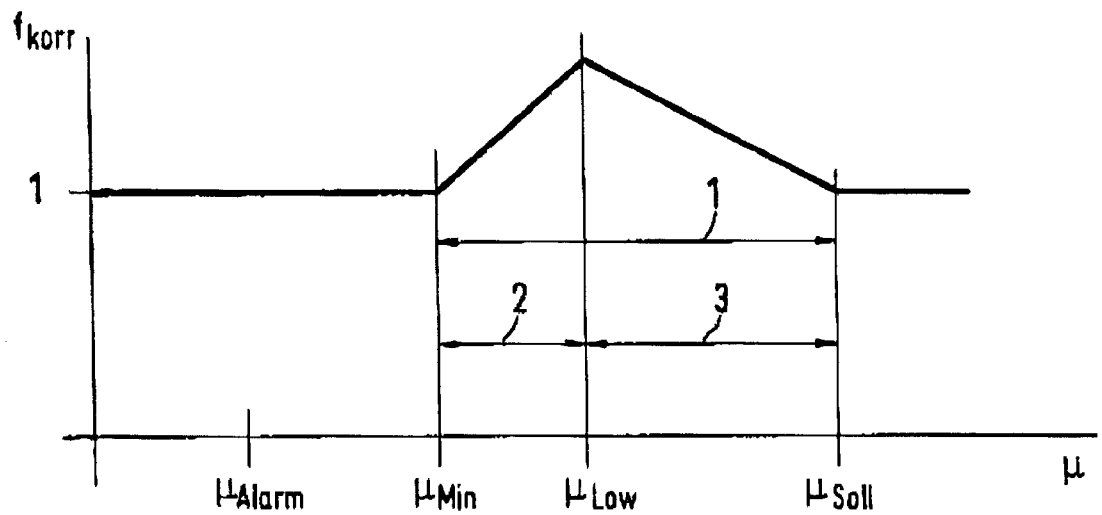

METHOD AND DEVICE FOR VARIABLY SETTING THE BRAKE FORCE IN A HYDRAULIC BRAKE SYSTEM OF A MOTOR VEHICLE

The invention relates to a method and a device for variably setting the braking force in a hydraulic brake system of a motor vehicle according to the preamble of claims 1 and 15, respectively.

DE 35 26 556 A1 discloses a brake system for motor vehicles which comprises a master cylinder which is designed as a tandem cylinder and is actuated by a brake pedal. Also provided is an auxiliary pressure supply system which comprises a hydraulic pump for producing the required brake pressure, and an electric motor actuating the pump, the hydraulic medium delivered by the pump being fed to the wheel braking device in order to produce the required braking force.

Printed publication DE 44 27 170 C1 discloses a method for ensuring the braking effect of brakes of vehicles in the event of moisture. For this purpose, a conclusion is drawn on the presence of moisture via a sensor device. If moisture is present, the time period is determined during which the brakes of the vehicle have not been actuated. If this time period overshoots a time threshold value, a braking operation is undertaken in which a vehicle retardation not perceptible to the driver is initiated. This braking operation vaporizes the water being precipitated on the brake and, the immediate and complete functionality of the brake is ensured. Moreover, DE 44 27 170 C1 discloses detecting the temperature of the brake parts and undertaking a braking operation for the case that the brake temperature undershoots a temperature limiting value. There is no disclosure of a determination of the friction factor of the brake disc/brake pad pairing nor of a compensation, based thereon, of a diminishing friction factor by means of increasing the brake pressure.

A further device for measuring and/or regulating the braking force in the brake system of a motor vehicle is disclosed in EP 0 189 082 A2. It is proposed in this printed publication to set the braking force of the wheel brakes so as not to overshoot a permissible maximum temperature value. This is intended to permit functioning continuous operation with a high, constant braking force. However, this device has the disadvantage that there is a need during the regulation to take account of relatively long time delays in the propagation of heat in the brake system, as a result of which the brake system to be regulated reacts relatively sluggishly, and maximum braking forces cannot be maintained continuously.

The publication PATENT ABSTRACTS OF JAPAN vol. 017, No. 430 (M-1460) discloses a device with the aid of which there is determined for the brake pressure a desired value which corresponds to the brake pressure which is to be set by the driver at the front wheels on the basis of the actuation of the brake pedal. The friction factor present for the brake disc/brake pad pairing is taken into account when calculating this desired value. This friction factor is determined as a function of the temperature and the rotational speed of the brake disc. No provision is made to increase the brake pressure in the case of an impermissible undershooting of the actual friction factor by comparison with the desired friction factor.

GB-A-2 297 134 A relates to a method and a device for controlling an ABS/PCS system. The aim in this case is to save entirely or partly on the vacuum brake busting, and to implement hydraulically the necessary brake busting by suitably driving a return pump and valves which are respectively included in the hydraulic unit. In addition to the implementation of pressure control in which the brake pressure in the wheel brake cylinders is set in accordance with the actuation of the brake pedal undertake by the driver, a function is also described with the aid of which a [inaudible] of the friction factor between the brake pads and brake discs, which is denoted as fading, is detected and appropriate counter measures are taken. Various evaluations are undertaken in order to be able to detect a diminution in the friction factor. Thus, a check is made as to whether the brake pressure prevailing in the master brake cylinder is higher than a threshold value; as to whether there is an actuation of the stop light switch, as to whether the ABS regulation is active; as to whether the speed of the vehicle is greater than zero or a threshold value; and as to whether the ABS system is operating properly. The pressure in the wheel brake cylinder is increased if a diminution in the friction factor is detected. The pressure is preferably raised in steps until the ABS regulations sets in at all wheels of the vehicle, or a maximum permissible prescribable pressure difference between the pressure of the wheel brake cylinder and the pressure in the master brake cylinder is reached. The determination of the actual friction factor of the brake disc/brake pad [inaudible], and an evaluation of the same with the aid of a desired friction factor are not disclosed. Also not disclosed is to increase the brake pressure to a value multiplied by a correction factor if the actual friction factor is within a defined friction factor stabilization range.

The following object emerges against this background: the aim is for a diminishing braking effect in hydraulic brake systems firstly to be detected simply and reliably, and secondly to be compensated in wide ranges without the brake system being overloaded in the process.

This object is achieved according to the invention with the aid of the features of claims 1 and 15, respectively.

The actual friction factor between the brake disc and brake pad of a wheel brake characterizes the conversion of the clamping force of the calliper into the retarding force on the brake disc. If the actual friction factor between the brake disc and brake pad impermissibly undershoots the desired friction factor, the brake pressure is stepped up, as a result of which a diminished brake power, which can arise as a consequence of overheating, wear or environmental influences such as moisture, pollution or the formation of ice, can be at least partially compensated such that no worsening of the brake power occurs, either subjectively or objectively. In order to prevent over-stressing of the brake system and brake fading resulting therefrom, stressing of the brake system and brake fading resulting therefrom, or to prevent a possible brake failure as a consequence of the increase in brake pressure carried out automatically, as an additional condition before the brake pressure increase, a check is made as to whether the actual friction factor is within a defined stabilization range which comprises a band of friction factors below the desired friction factor marking a maximum. The increase in brake pressure is carried out if the actual friction factor lies within this stabilization range. If the actual friction factor lies below the stabilization range, for reasons of overload protection it is not expedient to carry out an increase in brake pressure; in this case the brake pressure increase does not take place, and fault or alarm signal is displayed which informs the driver of the poor brake condition.

The stabilization range can be permanently prescribed, or it can be determined in the course of operation with the aid of changing state variables or performance quantities such as, for example, maximum achievable retardation, temperature of the brake system, wetting of the brake parts with moisture, etc., a high measure of flexibility being achieved thereby.

In an advantageous development, the stabilization range is subdivided into a constant range, in which a constant, maximum braking retardation can be maintained over deteriorating friction factors, and into a gradient range in which although the brake pressure is piled the maximum braking retardation is not achieved. The constant range in this case comprises higher friction factors than the gradient range and the two ranges together expediently fill up the stabilization range completely. The boundary between the constant range and gradient range—the lower friction factor of the constant range—is advantageously variably set. With increasing temperature of the wheel-braking device, it is particularly expedient to displace the lower friction factor of the constant range in the direction of the lower limit of the gradient range, as a result of which the constant range is expanded at the expense of the gradient range. The result of this displacement of the lower friction factor of the constant range is to achieve a constant retardation over an increasing range of small friction factors without displacing the lower limit, serving the functional reliability, of the stabilization range further in the direction of smaller friction factors.

In order to compensate diminishing braking forces, the brake pressure is operated on by a correction factor which is greater than one and which is expediently calculated as a function of the measured or computed actual friction value, the desired friction value and the lower limiting value of the current range—the gradient range or the constant range. The correction factor advantageously rises linearly in this case in the constant range, starting from the value 1, with decreasing friction factors, and subsequently drops in the gradient range with decreasing friction factors in a continuous and linear fashion until it reaches the value 1 for the lower friction factor of the gradient range.

The correction factor becomes ever larger in the constant range, the smaller the lower friction factor of the constant range becomes, that is to say the more the lower friction factor of the constant range is displaced in the direction of the lower limit of the gradient range. It is thereby possible to take account of the fact that an increasing brake pressure is required with increasing temperature in order to compensate the temperature-induced brake fading.

Figure 2:
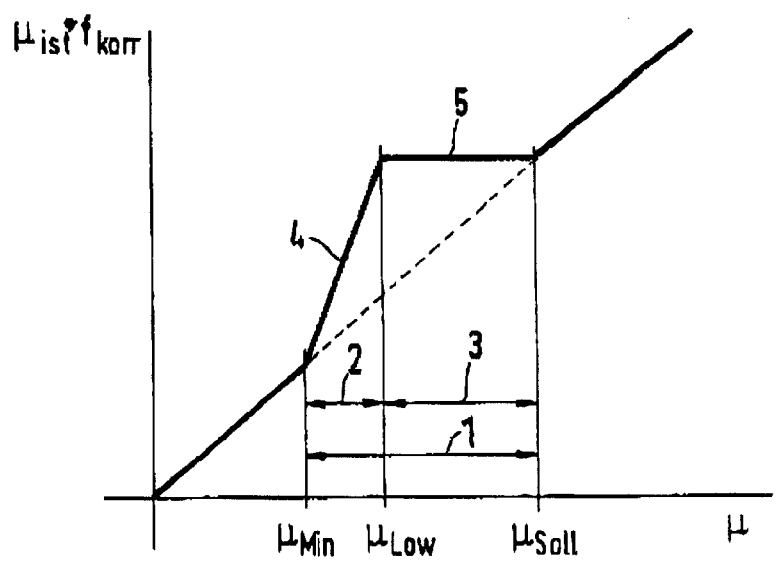

Further advantages and expedient embodiments are to be gathered from the further claims, the description of the figures and the drawings, in which:

FIG. 1 shows a diagram with the profile of the correction factor for increasing the brake pressure as a function of the friction factor, and FIG. 2 shows a diagram with the profile of a friction factor excessively increased by the correction factor, as a function of the real actual friction factor.

In accordance with FIG. 1, the friction factors $\mu$, plotted on the abscissa, between the brake disc and brake pad of a wheel brake are subdivided into different ranges. Extending between a lower limiting value $\mu_{min}$ and a desired friction factor $\mu_{soll}$, which simultaneously marks the usually reachable friction factor maximum between the brake disc and brake pad, is a stabilization range 1 within which additional measures are taken to boost the braking effect of a hydraulic, in particular an electro-hydraulic vehicle brake. The stabilization range 1 is subdivided into a lower gradient range 2 and an upper constant range 3, the gradient range 2 being between the lower friction factor $\mu_{min}$, marking the lower limit of the stabilization range 1, and the friction factor $\mu_{low}$, marking the lower limit of the constant range 3, and the constant range 3 is between the friction factor $\mu_{low}$ and the desired friction factor $\mu_{soll}$. The gradient range 2 and the constant range 3 border directly one another, both regions 2 and 3 completely filling up the stabilization range 1.

The correction factor $f_{korr}$ serves to compensate diminished friction factors in order to ensure a desired vehicle retardation even in the case of worsened friction factors. The correction factor $f_{korr}$ is multiplied by the brake pressure determined by calculation in the electro-hydraulic brake and corresponding to a specific pedal pressure of the driver, it being possible as a result to compensate a diminishing braking effect. The correction factor $f_{korr}$ assumes a value greater than one only within the stabilization range 1, while outside the stabilization range 1 the value of the correct factor is equal to one such that brake pressure piling is carried out only for actual friction factors $\mu_{ist}$ within the stabilization range 1, but not above the upper limit of the stabilization range 1, the desired friction factor $\mu_{soll}$, and below the lower limit of the stabilization range 1, the lower friction factor $\mu_{min}$.

The determination of the correction factor as a function of the real actual friction factor, and the multiplication of the correction factor by the brake pressure corresponding to the pedal pressure of the driver and determined in the braking device offer the advantage that it is possible to react to a reduction in the actual friction factor directly and without loss of time. The brake system can be kept at its original, constant braking level independently of the physical cause of the loss in friction factor, at least within the constant range 3.

Within the stabilization range 1, the value of the correction factor $f_{korr}$ is greater than one, the function of the correction factor rising linearly, as a function of the friction factor for the lower or the upper limiting value $\mu_{min}$, $\mu_{soll}$, starting at one, to the friction factor $\mu_{min}$ lying between the gradient range 2 and constant range 3. The function of the correction factor assumes a maximum in the case of the friction factor $\mu_{min}$ and the function of the correction factor assumes a triangular form in the case of a linear rise.

The correction factor $f_{korr}$ is calculated within the constant range 3 as a function of the instantaneous actual friction factor $\mu_{ist}$ in accordance with the linear relationship $$f_{korr}=1+(\mu_{soll}/\mu_{low}-1)*(\mu_{soll}-\mu_{ist})/(\mu_{soll}-\mu_{low}),$$

and the correction factor $f_{korr}$ is determined within the gradient range 2 using the linear law $$f_{korr}=1+(\mu_{ist}-\mu_{min})/(\mu_{low}-\mu_{min})*(\mu_{soll}/\mu_{low}-1).$$

Instead of a linear function, it can be expedient to prescribe a non-linear profile for the correction factor $f_{korr}$ as a function of the actual friction factor $\mu_{ist}$.

The current actual friction factor $\mu_{ist}$ is advantageously determined from the vehicle retardation as measured or determined by calculation, and the current brake pressure applied. However, it can also be expedient to calculate the actual friction factor $\mu_{ist}$ from a comparison between the desired and actual vehicle retardation.

A minimum friction factor $\mu_{Alarm}$ is plotted below the lower limiting value $\mu_{min}$ of the stabilization range 1. If the current actual friction factor $\mu_{ist}$ reaches the minimum friction factor $\mu_{Alarm}$, an error signal is generated and displayed to the driver as an indication of a brake defect or of a dangerous situation.

FIG. 2 shows a representation of the friction factor increased by the correction factor $f_{korr}$, plotted against the real actual friction factor $\mu_{ist}$. The increasing of the friction factor $\mu_{ist}$ is performed exclusively in the stabilization range 1, within which the function of the increased friction factor deviates from a straight line through the origin. In the gradient range 2, the function of the friction factor $\mu_{ist}$ has a section 4, the gradient of which is increased by comparison with the straight line through the origin, whereas in the constant range 3 the corresponding section 5 of the function of the friction factor $\mu_{ist}$ is, admittedly, above the level of the straight line through the origin, but at a level which remains constant. As a consequence of the multiplication by the correction factor $f_{korr}$, a decreasing actual friction factor $\mu_{ist}$ is compensated in the constant range 3 to such an extent that a constant braking retardation is achieved despite a reduced actual friction factor. The correction factor $f_{korr}$ can thereby either, as illustrated, be used to multiply the determined actual friction factor $\mu_{ist}$, which features in the calculation of the required hydraulic brake pressure, or be used directly to multiply the brake pressure or to multiply some other variable which influences the brake pressure or the vehicle retardation.

The device for variably setting the braking force in the brake system of a motor vehicle comprises a regulating and control unit in which the actuating signals required for setting the desired brake pressure are generated. For this purpose, the regulating and control unit is fed the actual friction factor $\mu_{ist}$ as input signal, or the actual friction factor $\mu_{ist}$ is calculated from measured variables and compared with a desired friction factor $\mu_{soll}$. If the actual friction factor $\mu_{ist}$ undershoots the desired friction factor $\mu_{soll}$ in an impermissible way, and if, moreover, the actual friction factor $\mu_{ist}$ is within the stabilization range, the regulating and control unit generates an actuating signal with the aid of which the brake pressure is increased to a value multiplied by the correction factor $f_{korr}$.

In an expedient development, it can be provided for the purpose of improving the braking performance that in the event of moisture a low brake pressure at a level, advantageously, of approximately 3 bar to 8 bar is built up even during unbraked driving, in order to expel a water film on the brake disc by the application of the brake pads to the brake discs. The low brake pressure ensures that no perceptible, undesired vehicle retardation occurs. In order to avoid unnecessary automatic instances of brake actuation in the event of moisture, it can be expedient to trigger the braking function via a rain sensor and/or the use of the windscreen wiper. If appropriate, the engine torque is increased, for example by increasing the quantity of fuel injected and the corresponding air feed, in order to compensate the braking torque, and to keep the vehicle speed constant.

Furthermore, the risk of corrosion in the brake system can be reduced by building up a low brake pressure without perceptible vehicle retardation, as a result of which the temperature of the brake system can be stabilized at a low level harmless to the brake material, even in the case of unbraked driving. As a consequence of the increased brake temperature, the moisture is largely removed or kept away from the wheel brake. As an additional effect, the brake disc is freed from dirt and thawing salt.

The build-up of the brake pressure during unbraked driving can be carried out at intervals, the length of the intervals being determined by the length of driving times without braking triggered by the driver, by the wiper setting and by the braking load of a preceding braking operation.

In order to prevent vapour lock in the brake fluid as a consequence of brake overheating, the boiling point of the brake fluid can be increased by specifically including a residual pressure in the brake system, thus preventing the fluid from gassing out. Particularly in the case of very frequent and/or harsh actuation of the brakes in conjunction with slight actuation of the accelerator pedal, there is a risk of overheating in the brake system, and this can be counteracted by inclusion of the residual pressure. As a further parameter, the operating time of the brake fluid since the last change of brake fluid can be taken into account. It is expedient for the driver to be advised of the overstressing of the brake system.

What is claimed is:

1. A method for variably setting the braking force in a hydraulic brake system of a motor vehicle when a brake pressure is produced which is applied to a wheel-braking device, comprising the steps of:

determining a real actual friction factor ($\mu_{ist}$) between a brake disc and brake pad of at least one wheel brake and comparing an actual friction factor with a prescribable desired friction factor ($\mu_{soll}$), and increasing the brake pressure or a variable correlated with the brake pressure to a value multiplied by a correction factor ($f_{korr}$) when an impermissible undershooting of the actual friction factor ($\mu_{ist}$) by comparison with the desired friction factor ($\mu_{soll}$) occurs, and if the actual friction factor ($\mu_{ist}$) is within a defined friction factor stabilization range below the desired friction factor ($\mu_{soll}$), the correction factor ($f_{korr}$) being set to a value greater than one.

2. The method according to claim 1, wherein the friction factor stabilization range is subdivided into a lower gradient range and an upper constant range wherein a constant braking retardation in the constant range is achieved.

3. The method according to claim 2, wherein the correction factor ($f_{korr}$) rises within the constant range with decreasing actual friction factor ($\mu_{ist}$).

4. The method according to claim 3, wherein the correction factor ($f_{korr}$) rises linearly.

5. The method according to claim 2, wherein in the constant range, the correction factor ($f_{korr}$) obeys the law $$f_{korr}=1+(\mu_{soll}/\mu_{low}-1)*(\mu_{soll}-\mu_{ist})/(\mu_{soll}-\mu_{low})$$

wherein $\mu_{ist}$ denotes the actual friction factor, $\mu_{soll}$ denotes the desired friction factor, and $\mu_{low}$ denotes the lower friction factor of the constant range.

6. The method according to claim 2, wherein in the gradient range, the correction factor ($f_{korr}$) obeys the law $$f_{korr}=1+(\mu_{ist}-\mu_{min})/(\mu_{low}-\mu_{min})*(\mu_{soll}/\mu_{low}-1)$$

wherein $\mu_{min}$ denotes the lower friction factor of the gradient range.

7. The method according to claim 1, wherein a minimum friction factor ($\mu_{Alarm}$) lying below the stabilization range is defined, and an error signal is generated upon undershooting of the minimum friction factor ($\mu_{Alarm}$).

8. The method according to claim 2, wherein the lower friction factor ($\mu_{min}$) of the gradient range, the lower friction factor ($\mu_{low}$) of the constant range and/or the desired friction factor ($\mu_{soll}$) can be prescribed as a function of vehicle performance quantities, state variables or parameters.

9. The method according to claim 8, wherein with increasing temperature of the wheel-braking device the lower friction factor ($\mu_{low}$) of the constant range is displaced in the direction of the lower friction factor ($\mu_{min}$) of the gradient range.

10. The method according to claim 1, wherein the actual friction factor ($\mu_{ist}$) is determined from the measured vehicle retardation and the current brake pressure.

11. The method according to claim 1, wherein in the event of moisture, the brake pads are applied with low brake pressure to the brake discs.

12. The method according to claim 11, wherein the application of the brake pads to the brake disc is triggered by a signal from a rain sensor.

13. The method according to claim 11, wherein the application of the brake pads to the brake disc is triggered by the start-up of the wiper.

14. The method according to claim 1, wherein the brake pads are applied to the brake disc to such an extent that the temperature of the wheel-braking device approximately assumes a desired temperature.

15. A device for variably setting the braking force in a hydraulic brake system of a motor vehicle, having a regulating and control unit for generating actuating signals for setting a brake pressure in a wheel-braking device, wherein a real actual friction factor ($\mu_{ist}$) between a brake disc and brake pad of at least one wheel brake is fed as an input signal to the regulating and control unit or an actual friction factor is calculated in the regulating and control unit from measured variables, and in that the actual friction factor is compared with a prescribable desired friction factor ($\mu_{soll}$), and in that in the event of an impermissible undershooting of the actual friction factor ($\mu_{ist}$) by comparison with the friction factor ($\mu_{soll}$), an actuating signal is generated in the regulating and control unit and is used to increase the brake pressure to a value multiplied by a correction factor when the actual friction factor ($\mu_{ist}$) is within a defined friction factor stabilization range below the desired friction factor ($\mu_{soll}$).

16. The method according to claim 15, wherein the friction factor stabilization range is subdivided into a lower gradient range and an upper constant range wherein a constant braking retardation in the constant range is achieved.

17. The method according to claim 16, wherein the correction factor ($f_{korr}$) rises within the constant range with decreasing actual friction factor ($\mu_{ist}$).

18. The method according to claim 17, wherein the correction factor ($f_{korr}$) rises linearly.

19. The method according to claim 16, wherein in the constant range, the correction factor ($f_{korr}$) obeys the law $$f_{korr}=1+(\mu_{soll}/\mu_{low}-1)*(\mu_{soll}-\mu_{ist})/(\mu_{soll}-\mu_{low})$$

wherein $\mu_{ist}$ denotes the actual friction factor, $\mu_{soll}$ denotes the desired friction factor, and $\mu_{low}$ denotes the lower friction factor of the constant range.

* * * * *